United States Patent
Nagai et al.

(10) Patent No.: US 8,358,484 B2
(45) Date of Patent: Jan. 22, 2013

(54) MANUFACTURING METHOD OF DISK DRIVE DEVICE CAPABLE OF REDUCING AMOUNT OF UNBALANCE, DISK DRIVE DEVICE AND SUBASSEMBLY THEREOF

(75) Inventors: Kazuyoshi Nagai, Shizuoka (JP); Hiroshi Iwai, Shizuoka (JP)

(73) Assignee: Alphana Technology Co., Ltd., Shizuoka (JP)

( * ) Notice: Subject to any disclaimer, the term of this patent is extended or adjusted under 35 U.S.C. 154(b) by 410 days.

(21) Appl. No.: 12/631,703

(22) Filed: Dec. 4, 2009

(65) Prior Publication Data
US 2010/0220412 A1 Sep. 2, 2010

(30) Foreign Application Priority Data

Mar. 2, 2009 (JP) ................................ 2009-048017

(51) Int. Cl.
*G11B 17/02* (2006.01)
*G11B 5/596* (2006.01)

(52) U.S. Cl. ................................ 360/99.12; 360/77.04

(58) Field of Classification Search ............... 360/98.08, 360/99.05, 99.12, 77.04
See application file for complete search history.

(56) References Cited

U.S. PATENT DOCUMENTS

| 5,404,253 | A | * | 4/1995 | Painter ...................... 360/77.04 |
| 6,418,612 | B1 | * | 7/2002 | Chuang et al. ............. 29/603.03 |
| 6,698,286 | B1 | * | 3/2004 | Little et al. ...................... 73/469 |
| 6,897,393 | B1 | * | 5/2005 | Codilian et al. ............... 209/571 |
| 7,924,519 | B2 | * | 4/2011 | Lambert ......................... 360/31 |
| 2002/0021523 | A1 | * | 2/2002 | Ishizuka .................... 360/77.03 |
| 2002/0092351 | A1 | * | 7/2002 | Horning et al. ................. 73/468 |
| 2003/0123180 | A1 | * | 7/2003 | Settje et al. ................ 360/77.04 |
| 2006/0066994 | A1 | * | 3/2006 | Suzuki et al. .............. 360/99.08 |
| 2007/0176503 | A1 | * | 8/2007 | Yajima ............................ 310/90 |
| 2011/0128647 | A1 | * | 6/2011 | Gauzner et al. ................. 360/75 |

FOREIGN PATENT DOCUMENTS

JP    2007-198555    8/2007

* cited by examiner

*Primary Examiner* — Craig A. Renner
*Assistant Examiner* — Adam B Dravininkas
(74) *Attorney, Agent, or Firm* — Fulwider Patton LLP

(57) ABSTRACT

A disk drive device is provided with a recording disk, a base member, a bearing unit, and a hub member. In a marking step, unbalance information indicating the displacement of the center of gravity of the hub member with respect to the rotation center of the hub member is acquired, and an information mark containing the unbalance information is applied to at least the hub member or the base member. In an installing and adjustment step, the unbalance information is read form the information mark, and the position for installing the recording disk in an outer cylinder part is determined in accordance with the unbalance information so as to install the recording disk on the hub member.

15 Claims, 5 Drawing Sheets

MANUFACTURING METHOD OF DISK DRIVE DEVICE CAPABLE OF REDUCING AMOUNT OF UNBALANCE, DISK DRIVE DEVICE AND SUBASSEMBLY THEREOF

CROSS-REFERENCE TO RELATED APPLICATION

This application is based upon and claims the benefit of priority from the prior Japanese Patent Application No. 2009-048017, filed on Mar. 2, 2009, the entire content of which is incorporated herein by reference.

BACKGROUND OF THE INVENTION

1. Field of the Invention

The present invention relates to a manufacturing method of a disk drive device, a disk drive device and a subassembly of the disk drive device, and particularly to a technique for reducing the amount of unbalance of the disk drive device.

2. Description of the Related Art

Recently, disk drive devices such as HDDs have been dramatically improved in their rotational accuracy by providing fluid dynamic bearings as disclosed in, for example, JP Laid-Open Publication No. 2007-198555. In accordance with this movement, there have been demands for disk drive devices with higher density and larger capacity. For example, in a disk drive device that magnetically records data, a recording disk on which a recoding track is formed is rotated at high speed, and a magnetic head reads or writes the data by tracing the recoding track while keeping a slight gap above the recoding track. In order to provide a disk drive device with high density and large capacity, both the width of recording track and the gap between the magnetic head and the recording disk need to be smaller.

Since a disk drive device rotates a recording disk, the size of the amount of unbalance at a rotating part is critical. It can be assumed that the amount of unbalance is the amount of displacement, from the rotation center, of the center of gravity of an object in a stationary state or in a state of rotation or the amount of unbalance is displacement (axial run-out) from a reference position in a rotation axis direction. A large amount of unbalance of a rotational part of a disk drive device causes great vibration at the time of rotation and is thus likely to cause the displacement (i.e., off-tracking) of a magnetic head from its regular position, for example, from the center of a recording track, when the magnetic head traces over the recording track. As described above, narrowing down the width of a recording track to provide a disk drive device with high density and large capacity results in the effects of off-tracking to be notably shown, which becomes a cause for the increased error rate of reading/writing data. In other words, a large amount of unbalance of a disk drive device hinders a disk drive device from having high density and large capacity.

One of the factors for determining the amount of unbalance of a disk drive device (hereinafter, referred to as DBT) is the amount of unbalance of a hub member on which a recording disk is mounted (hereinafter, referred to as DBH). Another factor is the displacement of the center of gravity from the rotation center, caused by the deviation of a gap formed between the center hole and the outer cylinder part, off to one side when a recording disk is mounted on the outer cylinder part of a hub member through the center hole. In other words, there is the amount of unbalance that is caused by the mounting of a recording disk (hereinafter, referred to as DBD). Therefore, in accordance with an incidental combination of DBH and DBD, a DBT becomes larger when both amounts of unbalance are added up, and the DBT becomes smaller when both amounts of unbalance cancel out each other. As a result, this causes a huge variation in DBT, hindering a disk drive device from having high density and large capacity and the quality stability. Accordingly, efforts have been made toward the reduction of DBH and DBD in order to reduce DBT.

As described above, DBH and DBD need to be reduced in order to reduce DBT. For example, as a means for reducing DBH, one possible option is to improve the part accuracy by adding a process of modifying the amount of unbalance on a hub member. However, the process of modifying the amount of unbalance is not preferable since it requires increased processing time, increased processing cost, and the like. Another possible approach for reducing DBD is to reduce the gap between the center hole of a recording disk and the outer cylinder part of a hub member. However, this reduction in the gap results in a poor workability at the time of mounting a recording disk on a hub member. In other words, the reduction in the gap is not preferable since careful attention is required for assembly tasks so as not to cause the deformation or damage of parts, which results in the reduced efficiency of work. The reduction in the gap between a center hole and an outer cylinder part can be interference in the pursuit of the automatic assembly of a disk drive device.

The inventors and others have reached the conclusion that a reduction in DBT with almost no machining process, such as a modification process on a hub member or a recording disk, allows for the realization of a disk drive device with high density and large capacity without increasing the cost or interfering the pursuit of automatic assembly.

SUMMARY OF THE INVENTION

Accordingly, the present invention has been made to solve the aforementioned problems, and a purpose of the invention is to provide a manufacturing method of a disk drive device capable of reducing DBT with almost no machining process, such as a modification process, on a hub member or a recording disk, a disk drive device, and a subassembly of the disk drive device.

A manufacturing method of a disk drive device according to one embodiment of the present invention comprises: a recording disk; a base member; a bearing unit arranged on the base member; and a hub member that has both an outer cylinder part extending in the axial direction of the bearing unit to hold the recording disk and an outward extension portion formed continuously with the outer cylinder part and extending outward in the radial direction of the recording disk and that is rotatably supported by the bearing unit, wherein the manufacturing method comprises: marking, after acquiring unbalance information indicating at least the displacement of the center of gravity of the hub member with respect to the rotation center of the hub member or the axial run-out of the outward extension portion, an information mark containing the unbalance information on at least the hub member or the base member; and installing the recording disk and adjusting the position for installing the recording disk after reading the unbalance information from the information mark and then determining the position for installing the recording disk in the outer cylinder part in accordance with the unbalance information.

The disk drive device may be a so-called shaft rotation disk drive device where a base member immovably supports the outer circumference of a bearing unit so that a shaft connected to a part of a hub member or to a hub member at the side of the inner circumference of the bearing unit is rotatably supported. Alternatively, the disk drive device may be a so-called fixed-shaft disk drive device where a bearing unit is rotatably supported by a shaft fixed to a part of a base member or to a base member and where a hub member is fixed to the bearing unit.

Unbalance information indicates at least the displacement of the center of gravity of the hub member with respect to the rotation center of the hub member or the axial run-out of the outward extension portion. For example, the unbalance information may indicate the amount of displacement of the hub member in the direction parallel to the surface of the outward extension portion or may indicate the amount of displacement in the direction perpendicular to the surface of the outward extension portion, that is, the axial run-out of the mounting surface of a recording disk. Alternatively, the unbalance information may indicate the combined amount of displacement of the two. The unbalance information may include information indicating the amount of displacement by an orthogonal coordinate system or by a polar coordinate system.

The unbalance information can be detected, for example, by a balancing machine. In the marking step, the detected unbalance information is converted into a predetermined information mark and then marked. The information mark may indicate, for example, the amount of displacement or the axial run-out by the size of the mark or by the marking position and may be marked after being converted into an identifier such as a barcode. In addition to the unbalance information, the information mark may include the individual information of the disk drive device. The individual information may include, for example, manufacturing related information or characteristic information of the disk drive device. The amount of the displacement of the center of gravity of the hub member with respect to the rotation center of the hub member or the amount of the axial run-out is acquired from the information mark and the position for installing the recording disk in the outer cylinder part is determined so as to reduce the amount of the displacement or the amount of the axial run-out by installing the recording disk in installing the recording disk and adjusting the position for installing the recording disk. For example, installing the recording disk so that the center of gravity position of the hub member faces the center of gravity position of the recording disk allows the position of the overall center of gravity of both the recording disk and the hub member to be closer to the rotation center when the recording disk installed in the hub member rotates in an integral manner. In other words, the amount of unbalance of the disk drive device can be reduced when the recording disk rotates while being installed in the hub member.

According to the embodiment, the amount of unbalance can be reduced by a positioning task at the time of assembly with almost no machining process such as a modification process on a hub member or a recording disk.

Another embodiment of the present invention is a disk drive device. The device comprises: a recording disk; a base member; a bearing unit arranged on the base member; and a hub member that has both an outer cylinder part extending in the axial direction of the bearing unit for holding the recording disk and an outward extension portion formed continuously with the outer cylinder part and extending outward in the radial direction of the recording disk and that is rotatably supported by the bearing unit, wherein the position for installing the recording disk in the outer cylinder part is determined in accordance with the unbalance information indicating at least the displacement of the center of gravity of the hub member with respect to the rotation center of the hub member or the axial run-out of the outward extension portion.

According to the present embodiment, the position for installing the recording disk is determined based on the unbalance information, allowing a disk drive device having a small amount of unbalance to be obtained without modifying the design or improving the processing accuracy of components constituting the disk drive device.

Still another embodiment of the present invention is a subassembly of a disk drive device. The subassembly of a disk drive device comprising: a base member; a bearing unit arranged on the base member; and a hub member that has both an outer cylinder part extending in the axial direction of the bearing unit for holding a recording disk and an outward extension portion formed continuously with the outer cylinder part and extending outward in the radial direction of the recording disk and that is rotatably supported by the bearing unit, wherein at least the hub member or the base member has an information mark containing unbalance information indicating at least the displacement of the center of gravity of the hub member with respect to the rotation center of the hub member or the axial run-out of the outward extension portion.

According to the present embodiment, the subassembly of a disk drive device can be assembled to be a disk drive device having a small amount of unbalance based on the unbalance information contained in the information mark without performing a machining process such as a modification process.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
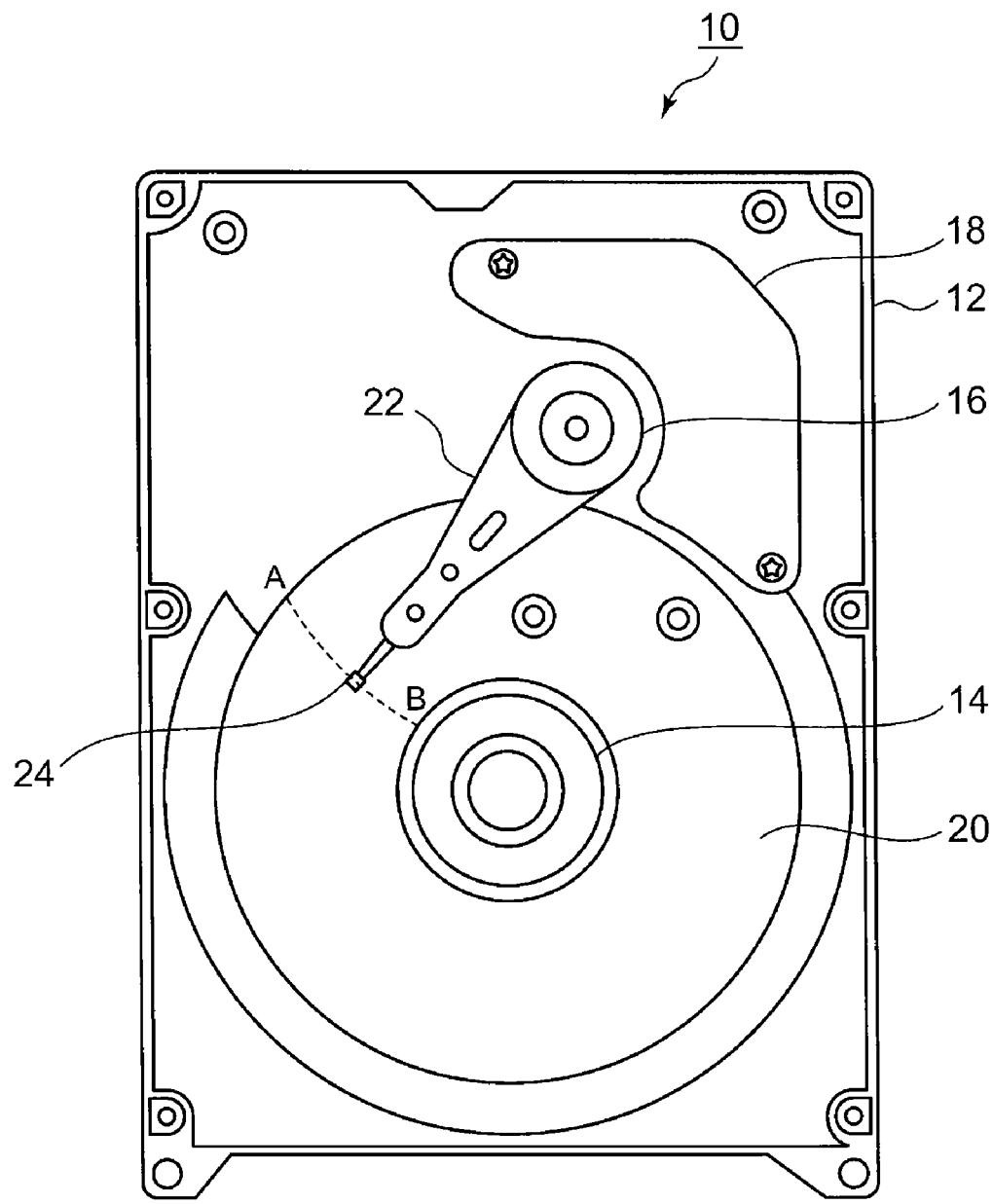
FIG. 1 is a schematic view showing the internal configuration of a disk drive device according to the embodiment.

A description will now be given of the embodiments of the present invention based on figures in the following. FIG. 1 is a schematic view showing the internal configuration of a hard disk drive device (HDD) 10, which is one of the examples of the embodiment. FIG. 1 shows the HDD without a cover so that the internal configuration is exposed.

A brushless motor 14, an arm bearing unit 16, a voice coil motor 18, etc., are mounted on the upper surface of a base member 12. The brushless motor 14 can be, for example, a spindle motor having twelve slots magnetized in eight poles. The brushless motor 14 rotationally drives, for example, a recording disk 20 capable of magnetically recording data. The brushless motor 14 is driven by drive currents of three phases U-phase, V-phase, and W-phase. The arm bearing unit 16 supports a swing arm 22 in such a manner that the swing arm 22 swings freely in a range of movement AB. The voice coil motor 18 swings the swing arm 22 in accordance with external control data. At the tip of the swing arm 22, a magnetic head 24 is provided. When the HDD 10 is operating, the magnetic head 24 moves over the surface of the recording disk 20 with a slight space in between with the swing of the swing arm 22 in the range of movement AB so as to read/write data. In FIG. 1, a point A corresponds to the position of the outermost recording track of the recording disk 20, and another point B corresponds to the position of the innermost recording track of the recording disk 20. The swing arm 22 may be moved to a waiting position provided on the side of the recording disk 20 when the HDD 10 is in a resting state.

Since an HDD 10 configured as described above rotates the recording disk 20, the size of the amount of unbalance at any rotating part is critical. An example of the amount of unbalance is the amount of displacement, from the rotation center, of the center of gravity of an object in its stationary state or in its state of rotation. A large amount of unbalance of a rotational part of a disk drive device causes great vibration at the time of rotation, and this is thus likely to cause the displacement (i.e., off-tracking) of the magnetic head 24 from its regular position, for example, from the center of a recording track, when the magnetic head traces over the recording track. Accordingly, the embodiment provides a technique for reducing the amount of unbalance not by a method where a major machining process such as a modification process is performed on a hub member or a recording disk but by an easy adjustment method at the time of manufacturing the HDD 10.

The description is now given of a disk drive mechanism of an HDD 10. In the embodiment, what includes all the structures for reading/writing data such as the recording disk 20, the swing arm 22, the magnetic head 24, and the voice coil motor 18 is described as an HDD 10 or as a disk drive device. Only the part that rotationally drives the recording disk 20 is sometimes described as a disk drive device.

Figure 2:
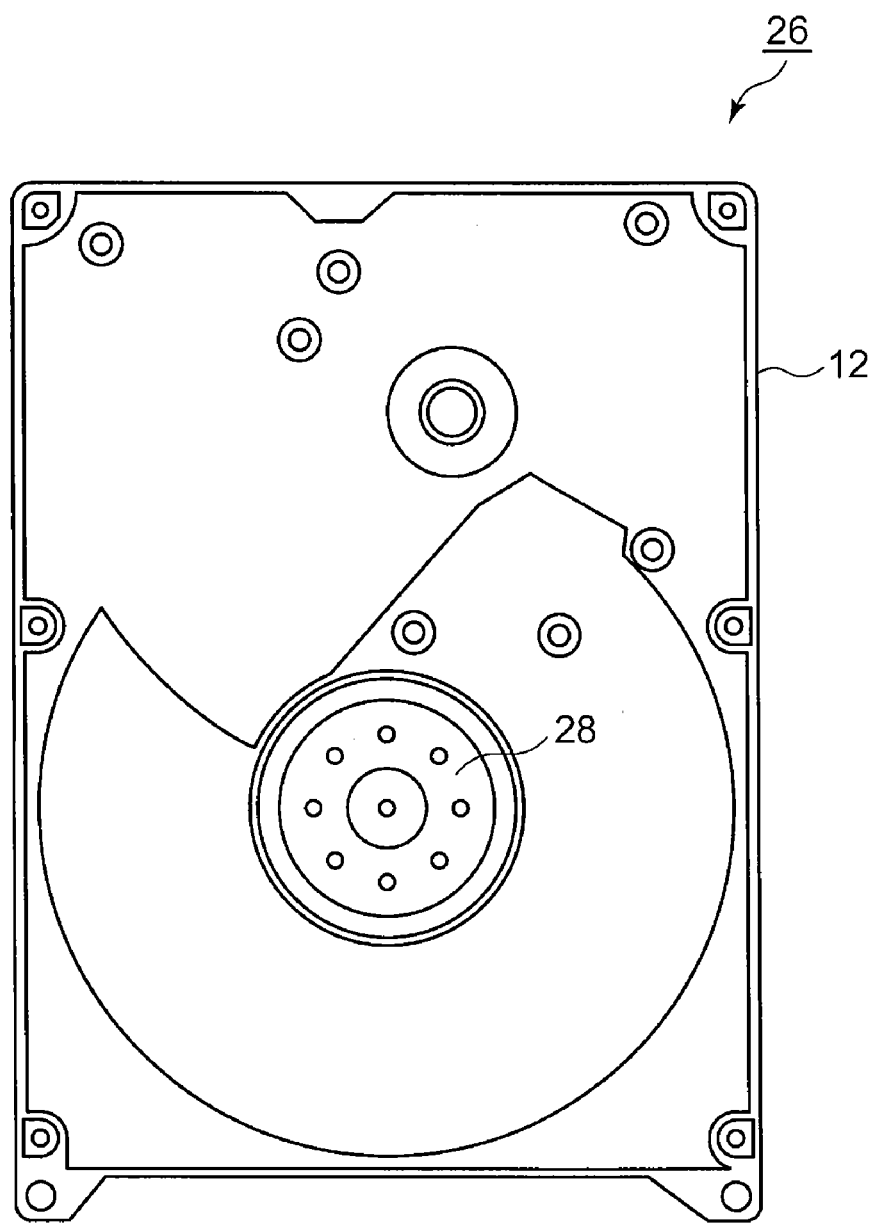
FIG. 2 illustrates the configuration of a subassembly obtained by eliminating a brushless motor, a voice coil motor, a swing arm, a magnetic head, etc., from the disk drive device shown in FIG. 1.

FIG. 2 illustrates the configuration of a subassembly 26 obtained by eliminating the brushless motor 14, the voice coil motor 18, the swing arm 22, the magnetic head 24, etc., from the HDD 10 shown in FIG. 1. A hub member 28 that is rotated by the brushless motor 14 is exposed at a position that is slightly shifted in a longitudinal direction from the approximate center of the base member 12. The subassembly 26 is configured, being provided with a fixed body section, a rotating body section, and a bearing unit that rotatably supports these two in a relative manner. The HDD 10 is produced by mounting the recording disk 20 (see FIG. 1) in engagement on the outer cylinder part of the hub member 28 of the subassembly 26 and installing the magnetic head 24, an electronic circuit unit (not shown), or the like.

Figure 3:
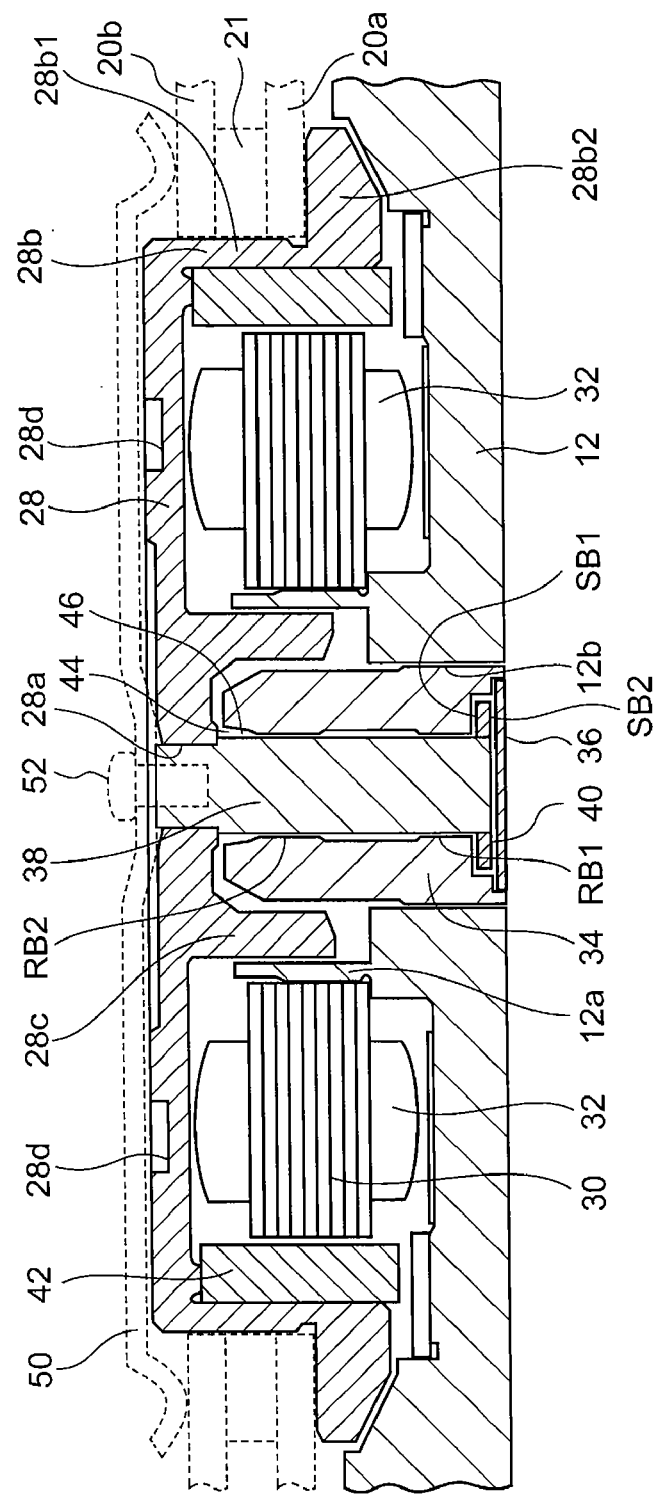
FIG. 3 is a partial cross sectional view showing, in detail, a fixed body section, a rotating body section, a bearing unit of a disk drive device of the embodiment.

A detailed description will be made regarding the fixed body section, the rotating body section, and the bearing unit based on FIG. 3. The fixed body section is provided with a base member 12, a stator core 30, and a drive coil 32. The base member 12 also serves as a housing for the HDD 10. The stator core 30 is fixed to the exterior wall surface of a cylindrical portion 12a formed on the base member 12. The stator core 30 is configured by laminating a magnetic steel sheet and is provided with, for example, twelve radial teeth extending outwards at even pitches along the circumference. The drive coil 32 is a three-phase coil wound around the teeth of the stator core 30. A three-phase approximate sinusoidal current flows through the drive coil 32 by a predetermined drive circuit, generating a rotating magnetic field. An substantially cylindrical sleeve 34 is fixed to a housing hole 12b formed on the base member 12. A disk-like counter plate 36 is fixed at one end portion of the sleeve 34, sealing the inside of the base member 12 housing the recording disk 20, etc.

A detailed description is now given of a rotating body section. The rotating body section comprises a hub member 28, a shaft 38, a flange 40, and a magnet 42. One end of the shaft 38 is fixed to a central hole 28a formed in the hub member 28, and the other end is fixed to the disk-like flange 40. The hub member 28 has an approximate cup shape, and the hub member 28 includes an outer peripheral cylindrical portion 28b and an inner peripheral cylindrical portion 28c in concentric with the central hole 28a. The cylindrical magnet 42 is fixed on the inner wall of the outer peripheral cylindrical portion 28b by using adhesive, etc. The magnet 42 is formed of, for example, an Nd—Fe—B (Neodymium-Ferrum-Boron) rare-earth material, and the surface thereof is treated with an anti-corrosion treatment such as electro-deposition coating or splay coating. In the embodiment, the magnet 42 has, for example, eight driving magnetic poles along the circumferential direction on the inner circumference thereof. The driving magnetic pole of the magnet 42 generates a rotational driving force by the mutual interaction with a rotating magnetic field generated by the drive of the drive coil 32 of the stator core 30 and rotationally drives a rotating body. The hub member 28 can be formed by die-forging or machining a metal such as aluminum and iron or a conductive resin.

The outer peripheral cylindrical portion 28b of the hub member 28 has both an outer cylinder part 28b1 extending in the axial direction of the shaft 38 and an outward extension portion 28b2 formed continuously with the outer cylinder part 28b1 and extending in the direction orthogonal to the axial direction, that is, outward in the radial direction of the recording disk 20. The hub member 28 is rotatably supported by the sleeve 34 that serves as a bearing unit via the shaft 38. The hub member 28 of the embodiment supports two recording disks 20 disposed via a spacer 21. The outer cylinder part 28b1 of the hub member 28 is engaged in the center hole of a recording disk 20a, and the outward extension portion 28b2 supports the recording disk 20a. The spacer 21 is disposed on the upper surface of the recording disk 20a and supports another recording disk 20b that is engaged with the outer cylinder part 28b1 of the hub member 28.

Figures 4A, 4B, 4C:
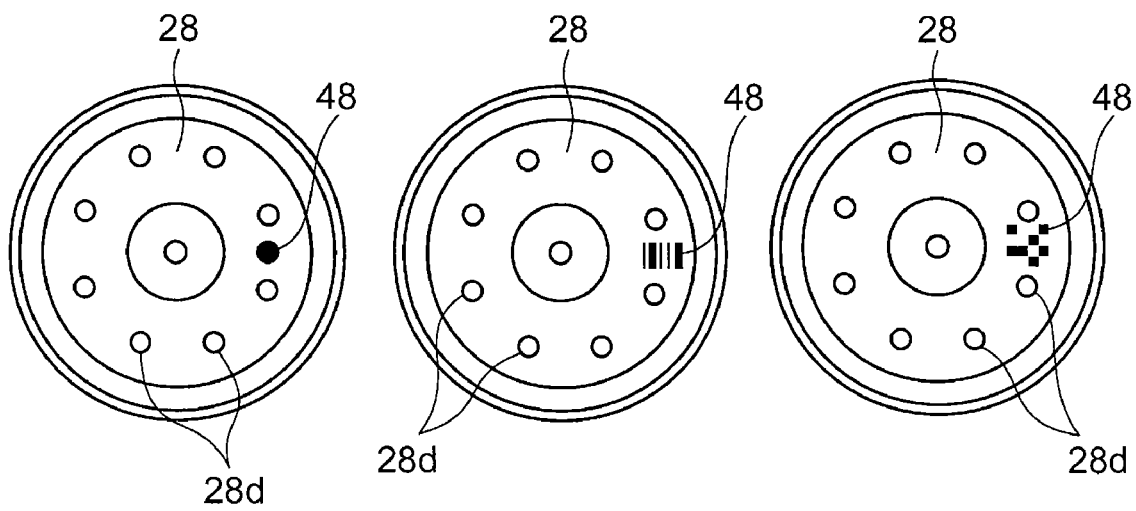
FIGS. 4A through 4C illustrate how information marks are provided to a disk drive device of the embodiment.

There is a need for an HDD 10 with a reduced weight. For this reason, a concave area 28d is provided on the upper surface of the hub member 28. The inventor and others have obtained an experimental result indicating that it is desirable to provide concave areas 28d, for example, at six or more positions along the circumferential direction of the hub member 28 at almost even pitches. FIGS. 4A-4C, which will be described hereinafter, show an example of forming the concave area 28d where the concave areas 28d are provided at eight positions along the circumferential direction at even pitches. The inventor and others have obtained an experimental result indicating that the concave area 28d preferably has a diameter of 1.2 mm or more in order to achieve the reduction in the weight in the case of an HDD 10 with outer peripheral cylindrical portion 28b, whose outer diameter is 18-22 mm, of the hub member 28, in other words, an HDD 10 of 2.5 inches. Another experimental result has also been obtained indicating that a concave area 28d with a diameter of 3.0 mm or less is preferable for rigidity. Another experimental result has also been obtained indicating that a concave area 28d with an effective depth of 3.0 mm or more is preferable to achieve the reduction in the weight and that a concave area 28d with an effective depth of 0.8 mm or less is preferable for rigidity.

A detailed description is now given of the bearing unit. For example, a radial fluid dynamic bearing is configured with a pair of herringbone-shaped radial dynamic pressure grooves RB1 and RB2 formed on the inner circumference of the sleeve 34, the grooves being vertically separated from each other in the axial direction of the shaft 38. The radial dynamic pressure groove RB2 at the side close to the open end of the sleeve 34 is arranged at the same height as or higher than the surface in the axial direction on which the recording disk 20a supported by the outward extension portion 28b2 is mounted. Disposing the radial dynamic pressure groove RB2 at such a position allows for a stable dynamic pressure support for the hub member 28 during rotation.

Herringbone-shaped or spiral-shaped thrust dynamic pressure grooves SB1 and SB2 are formed on the surface of the flange 40, which is opposite the end section of the sleeve 34, and on the surface of the flange 40, which is opposite the counter plate 36.

A capillary seal 44, where the gap between the inner circumference of the sleeve 34 and the outer circumference of the shaft 38 gradually increases toward the outside, is formed on the opening side of the sleeve 34. The space including the radial dynamic pressure grooves RB1 and RB2 and the thrust dynamic pressure grooves SB1 and SB2 and the capillary seal 44, up to the middle thereof, are filled with a lubricant 46, such as oil.

In response to the rotation of the shaft 38 constituting the rotating body section caused by a rotating magnetic field generated by the drive of the drive coil 32 of the stator core 30, the radial dynamic pressure grooves RB1 and RB2 generate a radial dynamic pressure in the lubricant 46, supporting the rotating body including the hub member 28 in the radial direction. In response to the rotation of the flange 40 along with the rotation of the shaft 38, the thrust dynamic pressure grooves SB1 and SB2 generate a thrust dynamic pressure in the lubricant 46, supporting the rotating body including the hub member 28 in the thrust direction. The capillary seal 44 prevents the leakage of the lubricant 46 with the capillary effect by preventing the lubricant 46 from moving too much toward the side of a space formed by the inner peripheral cylindrical portion 28c and the sleeve 34.

A detailed description will be made mainly regarding a manufacturing method of assembling the recording disk 20 on the subassembly 26 configured as described above. The manufacturing method of the disk drive device of the embodiment mainly includes: a marking step in which the amount of unbalance of the hub member 28 of the subassembly 26 is acquired and assigned to the subassembly 26; and an installation and adjustment step in which the installation position of the recording disk 20 is determined based on the marked amount of unbalance so as to install the recording disk 20.

The information indicating the amount of unbalance of the hub member 28 of the subassembly 26, for example, the information indicating the displacement of the center of gravity of the hub member 28 with respect to the rotation center of the hub member 28 is detected by using, for example, a well-known balancing machine or the like. The unbalance information indicating the amount of unbalance of the hub member 28 detected by the balancing machine is applied to the predetermined position of the hub member 28 or base member 12 of the subassembly 26 for which the information is detected.

In other words, the hub member 28 of the subassembly 26 is rotated, and the amount of unbalance of the hub member 28 on which the recording disk 20 is mounted (hereinafter, referred to as DBH) is acquired. The information regarding the displacement position that indicates that DBH may include, for example, the information indicated by an orthogonal coordinate system (x, y) with reference to the rotation center of the hub member 28 or the information indicated by a polar coordinate system (R, θ) with reference to the rotation center of the hub member 28. For the polar coordinate system, only an angular position that simply indicates the amount of unbalance, that is, the angular information that indicates the direction for the center of gravity of the hub member 28 can be used.

In the marking step, the acquired unbalance information is marked at a predetermined position on the hub member 28 or the base member 12. FIGS. 4A-4C show examples of marking an information mark 48 that indicates the unbalance information. FIG. 4A shows the information mark 48 printed in the shape of a filled circle by using, for example, an inkjet printer at a position corresponding to the angular position of DBH. The size of the filled circle, which is the information mark 48, or the distance from the rotation center of the hub member 28 to the filled circle may be determined in relation to the size of DBH. As described, using a simple mark such as a filled circle for the information mark 48 allows for a pinpoint display of the angular position so that an accurate angular position is indicated and so that a simple device is used for reading the angular position. FIG. 4B shows the information mark 48 marked at a position corresponding to the angular position of DBH by means of a barcode into which the unbalance information of DBH is encoded. FIG. 4C shows the information mark 48 marked at a position corresponding to the angular position of DBH by means of a geometrical pattern into which the unbalance information of DBH is encoded. As described above, using an encoded barcode or a geometrical pattern for the information mark 48 allows the unbalance information of DBH and other additional information to be stored in large quantities.

Although the examples of FIGS. 4A-4C show the information marks 48 being applied to the positions corresponding to the angular positions for DBH, the information mark 48 may be applied to a different position that has a constant relation to the angular position for DBH. As long as it is applied to a position in the subassembly 26 where the mark can be easily read, the different position can be appropriately selected. For example, the mark can be applied to the upper surface, lower surface, or side of the base member 12. The encoding method is not limited to the examples of FIGS. 4B and 4C. Other various methods can be also used. The display method may be, for example, a printing method where ink is used, a marking method where a laser is used, or a method of applying a sticker that is printed separately.

A detailed description will be made regarding the installation and adjustment step in which the installation position of the recording disk 20 is determined based on the information mark 48 so as to install the recording disk 20.

First, the unbalance information that the information mark 48 contains is read by using a reading device such as a laser scanner. For example, when only the angular information indicating the direction of the center of gravity of the hub member 28 is shown by the filled-circle information mark 48, as in FIG. 4A, the position of the information mark 48 is detected. When the information mark 48 is applied by being encoded into a barcode or a geometrical pattern, as in FIGS. 4B and 4C, the information mark 48 is read and further decoded in order to obtain the angular information of DBH of the hub member 28.

As described above, DBH is the amount of unbalance of the hub member 28. Thus, cancelling out this DBH by the amount of unbalance generated by other factors allows for the reduction in the overall amount of unbalance. More specifically, the amount of unbalance that occurs when the recording disk 20 is mounted on the hub member 28 is used. In other words, an amount of unbalance exists generated due to the recording disk 20 (DBD) due to the deviation of the gap, formed between the center hole and the outer cylinder part 28b1, off to one side when the recording disk 20 is mounted on the outer cylinder part 28b1 of the hub member 28 through the center hole. This DBD is used.

Figure 5:
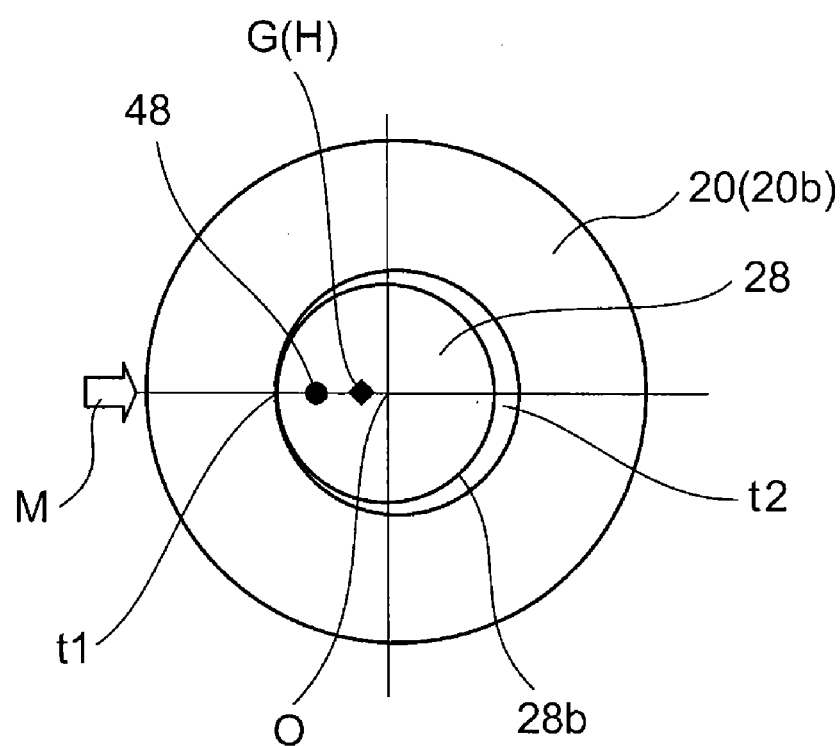
FIG. 5 illustrates how the amount of unbalance of a whole disk drive device (DBT) is reduced by the synthesis of DBH and DBD, which cancel out each other's amount of unbalance.

FIG. 5 illustrates how the amount of unbalance of a whole disk drive device (DBT) is reduced by the synthesis of DBH and DBD, which cancel out each other's amount of unbalance. More specifically, a position is determined for fitting the recording disk 20a, the spacer 21, and the recording disk 20b to the outer cylinder part 28b1 of the hub member 28 in accordance with the angular position indicated by DBH. FIG. 5 shows an example of the information mark 48 indicating DBH that is applied to the left of the rotational center O of the hub member 28. In other words, the center of gravity G (H) of the hub member 28 is shown to exist to the left of the rotational center O. Therefore, in the case of mounting the recording disk 20a, the spacer 21, and the recording disk 20b onto the hub member 28, determining the position while pushing them in the direction of an arrow M in the figure allows DBD to exist disproportionately to the right of the rotational center O. That is, a gap t1 between the center hole of the recording disk 20 and the outer cylinder part 28b1 is at a minimum, and the other gap t2 is at a maximum. In other words, the recording disk 20 and the like are mounted so that DBH and DBD cancel each other out. While keeping this condition, the recording disk 20a, the spacer 21, and the recording disk 20b are fixed to the hub member 28 in an integral manner by mounting a clamp 50 onto the recording disk 20b, followed by fixing the hub member 28 by a screw 52. As described above, when the recording disk 20 is mounted on the outer cylinder part 28b1 of the hub member 28 through the center hole, adjusting the gap between the center hole of the recording disk and the outer cylinder part so that the gap is moved to one side in accordance with the angular position for DBH allows for the reduction of the amount of generated unbalance, which is the remaining difference after DBH and DBD cancel each other out. With this, DBT of the entire disk drive device becomes at a minimum, and the vibration caused by the unbalance generated when the hub member 28, on which the recording disk 20 is mounted, drives rotationally can be reduced. In other words, a disk drive device with higher density and larger capacity can be easily achieved. The gap between the center hole of the recording disk 20 and the outer cylinder part 28b1 does not need to be processed to be unnecessarily small, contributing to the simplification of the automatic assembly of a disk drive device.

The axial run-out (hereinafter, referred to as ARO) of the outward extension portion 28b2 of the hub member 28, that is, the mounting surface for the recording disk 20a, also causes vibration of the disk drive device at the time of driving. In the embodiment, similar to above-stated DBH, the effects of ARO are reduced by the installation position of the recording disk 20.

In other words, similar to DBH, the unbalance information indicating ARO, as represented by the information mark 48, is applied to the hub member 28 or the base member 12. ARO can be obtained from the difference between the minimum value and maximum value of the height of the outward extension portion 28b2 in the axial direction during the rotation of the hub member 28 of the subassembly 26. The angular position when the difference between the minimum value and maximum value is at a maximum can be specified to be the angular position of ARO. In other words, the angular position, at which the value of axial run-out is at a maximum, (hereinafter, referred to as a maximum position) can be specified to be the angular position of ARO.

Depending on the relationship between ARO and DBD with respect to the angular position when the recording dusk 20 or the like is mounted on the outer cylinder part 28b1 of the hub member 28, ARO can also be reduced by cancelling ARO and DBD out with each other. In other words, the vibration of the disk drive device at the time of driving can be reduced.

The procedure for manufacturing the disk drive device will now be described in detail. As a pretreatment for the marking step, ARO is measured while rotating the hub member 28, and the angular position of ARO is detected. The detection is carried out by, for example, a laser displacement meter, a capacitance displacement meter, or the like. Similar to the examples shown in FIGS. 4A-4C, the information mark 48 indicating the angular position of ARO is marked on the hub member 28 or the base member 12. As in FIG. 4A, when the information mark 48 represented by a filled circle, the filled circle is printed at the position that corresponds to the angular position (the maximum position) of ARO, that is, in the direction of the maximum position of the axial run-out. The size of the filled circle or the distance from the center of the hub member 28 to the filled circle may be determined in relation to the size of ARO. The information mark 48 can be represented by a barcode or a geometrical pattern as in FIGS. 4B and 4C. The examples of FIGS. 4A-4C show the information marks 48 being applied to the positions corresponding to the angular positions of ARO, the information mark 48 may be applied to a different position that has a constant relation to the angular position of ARO. As long as it is applied to a position in the subassembly 26 where the mark can be easily read, the different position can be appropriately selected. For example, the mark can be applied to the upper surface, lower surface, or side of the base member 12.

In the installation and adjustment step for the recording disk 20, the recording disk 20 is mounted on the outer cylinder part 28b1 of the hub member 28 by changing the position of insertion in accordance with the angular position of ARO based on the information mark 48. In other words, the recording disk 20 is installed so that the maximum position of the axial run-out of the outer cylinder part 28b1 faces the center of gravity position of the recording disk 20. The description is omitted regarding the specific method for adjusting ARO and DBD since the method is the same as the method for adjusting DBH and DBD explained in FIG. 5.

As described above, when the recording disk 20 is mounted on the outer cylinder part 28b1 of the hub member 28 through the center hole, adjusting the gap between the center hole of the recording disk 20, so that the gap is moved to one side, allows for assembly in such a manner that ARO and DBD have an optimal relationship. With this, the vibration of the disk drive device at the time of driving can be reduced, contributing to the achievement of a disk drive device with high density and large capacity.

When the information mark 48 is represented by the barcode in FIG. 4B or by the geometrical pattern in FIG. 4C, the information mark 48 can include information other than DBH or ARO. For example, identification information of an individual subassembly 26 can be included. Unique identification information may be, for example, manufacturing related information of components that constitute the subassembly 26 or information such as the serial number, production date, production place, performance data, etc., of the subassembly 26. Adding such identification information is effective in producing a disk drive device.

For example, the serial number of the subassembly 26 is encoded and displayed as the information mark 48 on the hub member 28 or the base member 12. In another database, information is recorded that is associated with the serial number of the subassembly 26, such as information related to manufacturing components, production date, production place, and performance data of the subassembly 26. The information mark 48 applied to the hub member 28 or the base member 12 is then read and decoded so as to obtain the serial number at the time of manufacturing the disk drive device. The information that is associated with the serial number is retrieved from the database. As a result, one can easily obtain the information of the subassembly 26, which is manufactured at a time and place different from the time and place when the disk drive device is manufactured by assembly. In this case, the optimal recording disk 20 compatible with the subassembly 26 in the performance aspect can be selected to make a combination. For example, a combination of the subassembly 26 and the recording disk 20 that can most effectively reduce DBT of the disk drive device can be selected, contributing to the quality stability of the disk drive device.

Similarly, the information mark 48 can include manufacturing related information, which is related to the manufacturing of the hub member 28. When the hub member 28 is processed by cutting or by pressing by using a metallic mold, the hub member 28 can have a certain tendency in its measurement according to the properties of a machine or a metallic mold used for the process, a setting condition at the time of the process, a machining environment, etc.

For example, it is possible that there is a tendency that the height of the outward extension portion 28b2 is relatively high in the case where the hub member 28 is processed by a processing machine A and that the height of the outward extension portion 28b2 is relatively low in the case where the hub member 28 is processed by a processing machine B. Such a tendency can also be affected by a change in various elements such as the wearing down of the condition of a processing tool. Therefore, the tendency is not always constant and can change over time.

Similarly for the recording disk 20, disk performance such as the flatness, the smoothness, and the S/N ratio for magnetic recording varies from one to another according to the machine used for manufacturing and to the manufacturing rod. The variation in the performance can affect the error rate of the disk drive device. In consideration of such a variation in performance, the recording disk 20 whose performance is at the threshold on the down side of the performance can be mounted on the subassembly 26 with the hub member 28 having the outward extension portion 28b2 whose height or the variation in height is almost at the thresholds. In this case, the variations of the two can interact with each other, leading to an undesirable error rate of the disk drive device. This is a major cause of yield reduction in the disk drive device.

Therefore, obtaining information, as described above, for identifying at least one of the factories where the hub member 28 has been processed, the machine used for processing, or the date for processing can easily prevents a combination of the hub member 28 performing at almost the threshold and the recording disk 20 performing at almost its threshold. As a result, the possibility of producing a disk drive device by combining components with almost threshold performance is lowered, preventing the increase in the error rate.

In the same way, the information mark 48 can include manufacturing related information of the major components constituting the bearing unit that affects the performance of the subassembly 26 of the disk drive device. The major components that constitute the bearing unit are, for example, the sleeve 34, the shaft 38, the flange 40, the counter plate 36, and the base member 12. Applying at least one set of manufacturing related information for these components to the hub member 28 or the base member 12 easily prevents a combination of components with almost threshold performance, as described above. As a result, the possibility of producing a disk drive device by combining components whose performances are almost at their thresholds is lowered, preventing the increase in the error rate.

Indices for the performance of the hub member 28 of the subassembly 26 include NRRO (Non-Repeatable Run-out). NRRO indicates a vibration asynchronous with a rotation rate. When NRRO is large, NRRO causes a disturbance in data reading and writing by the magnetic head 24, preventing the track density of HDD 10 from being improved. Therefore, the assembly achieved by mounting a recording disk 20 having an almost ideal performance with a small variation on the subassembly 26 with small NRRO improves the error rate of the disk drive device. Contrarily, the assembly achieved by mounting a recording disk 20 with a non-ideal performance with a large variation on the subassembly 26 with almost threshold performance and with large NRRO whose performance increases the error rate of the disk drive device, causing the yield of the disk drive device to be decreased. Thus, including information regarding the performance of the subassembly 26 indicated by NRRO in the information mark 48 can easily prevent a combination of a subassembly whose performance indicated by NRRO is almost at its threshold and a recording disk 20 whose performance is almost at its threshold. As a result, the increase in the error rate of the disk drive device is prevented, improving the yield of the disk drive device.

There is a relationship between the size of the back electromotive force generated in the drive coil 32 of the subassembly 26 and the magnetic flux density of the magnet 42, where the size of the back electromotive force becomes larger as the magnetic flux density becomes larger and where the size of the back electromotive force becomes smaller as the magnetic flux density becomes smaller. It is to be noted that the small magnetic flux density of the magnet 42 results in producing only a small amount of torque, causing unstable rotation. Therefore, the assembly achieved by mounting a recording disk 20 whose performance is almost at its threshold among recording disks 20 that vary in their performances on the subassembly 26 with the magnet 42 whose magnetic flux density is almost at it threshold on the smaller side increases the error rate of the disk drive device, causing the yield of the disk drive device to be decreased. Thus, the back electromotive force generated in the drive coil 32 of the subassembly 26 is detected, and the information thereof is included in the information mark 48. With this, when combining the subassembly 26 and the recording disk 20, a combination of a subassembly 26 with the magnet 42 whose magnetic flux density is almost at it threshold on the smaller side and a recording disk 20 with almost threshold performance can be easily prevented. As a result, the increase in the error rate of the disk drive device is prevented, improving the yield of the disk drive device.

The magnetic flux density of the magnet 42 varies according to the manufacturing condition. As described above, the small magnetic flux density of the magnet 42 results in producing only a small amount of torque, causing unstable rotation of the disk drive device. Therefore, the assembly achieved by mounting a recording disk 20 whose performance is almost at its threshold among recording disks 20 that vary in their performances on the subassembly 26 with the magnet 42 with almost a threshold magnetic flux density on the smaller side increases the error rate of the disk drive device, causing the yield of the disk drive device to be decreased. Thus, the manufacturing related information of the magnet 42 of the subassembly 26 is included in the information mark 48. With this, when combining the subassembly 26 and the recording disk 20, a combination of a subassembly 26 with the magnet 42 with almost a threshold magnetic flux density on the smaller side and a recording disk 20 with almost threshold performance among recording disks 20 that vary in their performances can be easily prevented. As a result, the increase in the error rate of the disk drive device can be prevented, improving the yield of the disk drive device.

One kind of identification information or an appropriate combination of necessary information sets may be included in the information mark 48. Including two or more kinds of identification information allows for a more accurate understanding of the performance of the subassembly 26. Thus, the error rate of the disk drive device can be reduced, improving the yield of the disk drive device.

In the above embodiment, an example is shown of a so-called shaft rotation disk drive device. However, the same effects as those obtained in the embodiment can also be obtained by a fixed-shaft disk drive device.

As shown in FIGS. 4B and 4C, the information mark 48 including both the information for reducing DBT and the individual identification information of the disk drive device is shown in the embodiment. Multiple information marks 48 may be provided as another example. For example, an information mark 48 by which the angular position can be easily recognized as shown in FIG. 4A may be used for the information for reducing DBT, and an encoded information mark 48 such as a barcode may be used for the identification information. As described above, determining a combination of constituting components for the assembly of a disk drive device in reference to the individual identification information of a subassembly allows for the reduction of the error rate of the completed disk drive device. Therefore, the information mark 48 including the individual identification information of the subassembly of the disk drive device only may be marked on at least one of the hub member 28 and the base member 12.

The present invention should not be limited to each of the aforementioned embodiments, and various modifications such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

What is claimed is:

1. A subassembly of a disk drive device comprising:
a base member;
a bearing unit arranged on the base member; and
a hub member that has both an outer cylinder part extending in the axial direction of the bearing unit for holding a recording disk and an outward extension portion formed continuously with the outer cylinder part and extending outward in the radial direction of the recording disk and that is rotatably supported by the bearing unit, wherein
at least one of the hub member and the base member has an information mark containing an axial run-out information indicating the axial run-out of the outward extension portion.

2. The subassembly of a disk drive device according to claim 1 comprising a radial fluid dynamic bearing having a radial dynamic pressure groove arranged at the same height as or higher than the surface of the outward extension portion in the axial direction on which the recording disk is mounted.

3. The subassembly of a disk drive device according to claim 1, wherein the information mark indicates, by a polar coordinate system, the axial run-out information indicating the axial run-out of the outward extension portion.

4. The subassembly of a disk drive device according to claim 1, wherein the information mark indicates the direction of the maximum position of the axial run-out.

5. The subassembly of a disk drive device according to claim 1, wherein the information mark is indicated by a barcode including at least two segments into which the axial run-out information is encoded indicating the axial run-out of the outward extension portion.

6. The subassembly of a disk drive device according to claim 1, wherein the information mark contains individual identification information of the subassembly of the disk drive device.

7. The subassembly of a disk drive device according to claim 1, wherein the information mark contains manufacturing related information of the hub member.

8. The subassembly of a disk drive device according to claim 1, wherein the information mark contains manufacturing related information of the bearing unit.

9. The subassembly of a disk drive device according to claim 1, wherein the information mark contains NRRO information of the subassembly of the disk drive device.

10. The subassembly of a disk drive device according to claim 1, wherein the information mark contains information regarding back electromotive force generated in a drive coil of the subassembly of the disk drive device.

11. The subassembly of a disk drive device according to claim 1, wherein the information mark contains manufacturing related information of a magnet of the disk drive device.

12. A disk drive device comprising:
a recording disk;
a base member;
a bearing unit arranged on the base member; and
a hub member that has both an outer cylinder part extending in the axial direction of the bearing unit for holding the recording disk and an outward extension portion formed continuously with the outer cylinder part and extending outward in the radial direction of the recording disk and that is rotatably supported by the bearing unit, wherein
at least one of the hub member and the base member has an information mark containing an axial run-out information indicating the axial run-out of the outward extension portion,
the position for installing the recording disk in the outer cylinder part is determined in accordance with the axial run-out information contained in the information mark.

13. The disk drive device according to claim 12, wherein the position for installing the recording disk in the outer cylinder part is determined by acquiring the maximum amount of the axial run-out of the outward extension portion of the hub member by referring to the information mark, so as to reduce the amount of the axial run-out.

14. The disk drive device according to claim 12, wherein the recording disk is installed at the position where the maximum position of the axial run-out of the outward extension portion faces the center of gravity position of the recording disk across the rotation center of the hub member.

15. The subassembly of a disk drive device according to claim 12, wherein the information mark comprises a barcode including at least two segments encoded with the axial run-out information.

* * * * *